Feb. 28, 1956 H. M. GABLES 2,736,846

INTERFERENCE ELIMINATORS

Filed July 14, 1951

INVENTOR.
HALL M. GABLES
BY Fulwider & Mattingly
Attorney

United States Patent Office 2,736,846

Patented Feb. 28, 1956

2,736,846

INTERFERENCE ELIMINATORS

Hall M. Gables, Venice, Calif.

Application July 14, 1951, Serial No. 236,774

2 Claims. (Cl. 317—230)

My invention relates to interference eliminators, and has particular reference to an electroyltic cell which, when used in accordance with this invention, serves to materially improve the quality and clarity of the reception of intelligence transmitted by radio waves. The device is particularly adapted to use with communication receivers such as radio broadcast, television, facsimile, and like receiving devices.

It is well known that intelligence transmitted by radio waves suffers considerable degradation in quality and clarity, the reproduced intelligence never completely equalling the excellence of the original material. This degradation of quality and clarity is more noticeable in television reception than in radio broadcast reception, since the eye and visual perception mechanism is quick to detect distortion and interference, whereas in audible reproduction the ear and auditory response mechanism tends to minimize such faults and supply any elements that may be missing from the reproduction. It is known that the loss in quality and clarity is due in part to wave form distortion of the electrical signals, and often to a larger extent is due to local interference.

Local interference results from spurious signals which are received along with the desired signal, and results also from internally generated signals such as result from cross modulation, inductive transfers from one circuit to another, and resonant or ringing effects at frequencies other than that to which the receiving apparatus is tuned. The effects of the internally generated signals can, to a certain extent, be minimized by proper electrical and mechanical design of the various circuits employed, but cannot be eliminated. Also, such expedients add materially to the cost and complexity of the receiving apparatus. No means has been devised prior to this invention for eliminating the effects of spurious signals.

It is accordingly an object of my invention to provide a simple and inexpensive apparatus for use with communication receivers such as radio and television receivers which cooperates therewith to substantially eliminate the effects of unwanted interference.

It is also an object of my invention to provide an apparatus of the character set forth in the preceding paragraph which comprises a simple and inexpensive attachment suitable for use with substantially any type of communications receiver and arranged for ready attachment thereto without requiring any revision of the receiver circuits.

It is another object of my invention to provide an apparatus of the character set forth in the preceding paragraphs which includes one set of devices to be connected between the antenna and the receiving apparatus, and another set of devices to be connected between the receiving apparatus and the source of operating power for such receiver.

It is an additional object of my invention to provide an apparatus of the character described hereinbefore in which each device comprises a condenser of novel construction having an extremely low "Q" and high capacitance.

It is an additional object of my invention to provide an apparatus of the character set forth hereinbefore in which each device comprises an electrolytic cell of substantial plate area and low internal resistance.

It is a further object of my invention to provide an interference-free communications receiver consisting of the combination of a conventional receiver with electrolytic cells of substatial plate area and low internal resistance connected in series with the input circuits of said receiver.

It is also an object of my invention to provide a method of substantially eliminating interference in communication receivers which consists in passing the input currents to the receiver through a large capacitance and shunt electrolytic resistance of low ohmic value before applying said currents to the communications receiver.

Other objects and advantages of my invention will be apparent from a consideration of the following specification, read in connection with the accompanying drawings, wherein.

Figures 1, 2, 3, 4, 5:
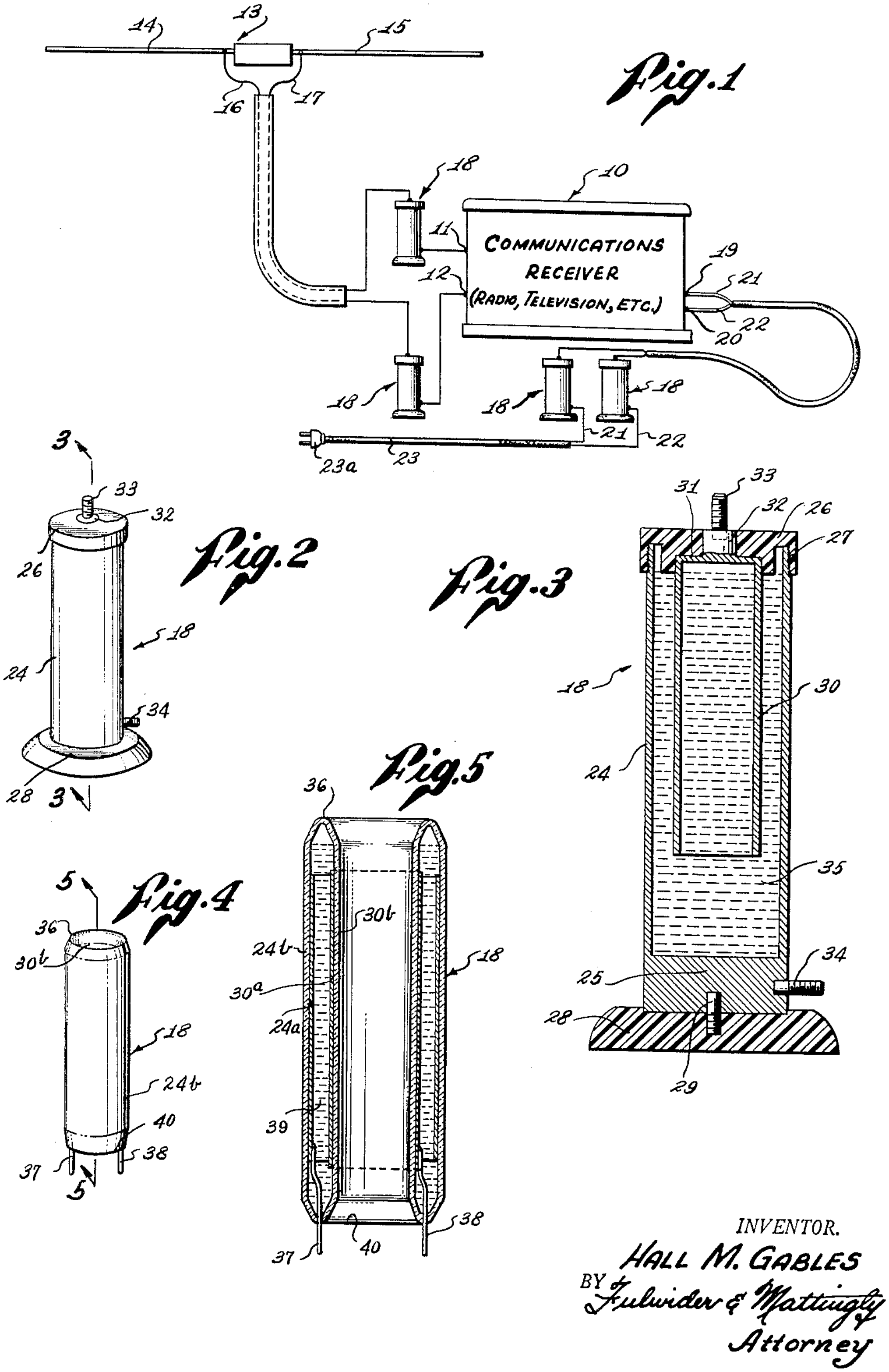
Fig. 1 is a diagrammatic view illustrating the manner in which the interference eliminating devices of my invention are connected in the input circuits to a conventional communications receiver.
Fig. 2 is a perspective view illustrating the general form and appearance of one form the devices of my invention may take.
Fig. 3 is a longitudinal sectional view taken substantially along the line 3—3 of Fig. 2.
Fig. 4 is a perspective view similar to Fig. 2 but illustrating the general form and appearance of another form my invention may take.
Fig. 5 is a longitudinal sectional view taken substantially along the line 5—5 of Fig. 4.

Referring to the drawings, I have illustrated diagrammatically in Fig. 1 the general arrangement and manner of use of my invention in connection with a communications receiver indicated generally by the reference character 10. The communications receiver 10 may comprise a conventional radio broadcast or short wave receiver, a television receiver, a receiving apparatus for use on facsimile transmission systems, or like receiving device for use with systems intended to transmit intelligence by radio waves from one point to another. The term "communications receiver" is used herein in a generic sense to include all such types of receiving apparatus.

The communications receiver 10 includes a pair of input terminals 11 and 12 to which is applied the incoming signal desired to be received. Such signal is ordinarily picked up by an antenna structure which may, for example, comprise a conventional dipole 13, the poles 14 and 15 of which are connected independently to a pair of lead-in conductors 16 and 17.

Conventionally the lead-in conductors 16 and 17 are connected to the terminals 11 and 12. However, in accordance with my invention an interference eliminator indicated generally by the reference character 18 is connected in series with each of the conductors 16 and 17. Preferably and pricipally for the purposes of convenience, the interference eliminators 18 are located near or adjacent the communications receiver 10.

The communications receiver 10 also includes a second pair of input terminals 19 and 20 normally connected as by means of conductors 21 and 22 to a suitable source of power for operating the receiver. Such a connection may be effected by the usual attachment plug such as is represented at **23*a* connected to the end of a cord or cable 23 within which is bound the conductors 21 and 22**.

Conventionally, the conductors 21 and 22 are extended unbroken from the attachment plug 23 to the terminals 19 and 20. However, in accordance with my invention, there is preferably connected in series with each of the conductors 21 and 22 one of my interference eliminating devices such as is represented in Fig. 1 by the reference character 18.

It will be understood that the devices 18 may be connected in the antenna circuit or alternatively in the power circuit as described and beneficial results will accrue from either maner of use. I have found, however, that even better results are achieved if the devices are used in both circuits.

The interference eliminating devices 18 each comprise a condenser of novel construction characterized by relatively high capacitance and an extremely low "Q" and in which the low "Q" is obtained by high electrolytic conductance between the two plates of the condenser.

In one form of my invention, as is illustrated in Figs. 2 and 3, the device 18 comprises an outer metallic tubular member 24 closed at the lower end as by the integrally formed closure portion 25 and having the normally open end thereof closed by a cap member 26 formed of insulating material and suitably secured to the upper end of the cylinder 24 as, for example, by means of threads 27. The cylinder 24 may be rested upon a suitable base member 28 preferably formed of insulating material to which the cylinder 24 is secured as, for example, by means of a threaded stud 29.

The cap member 26 serves to support an inner metallic tubular member 30 which is open at its lower end and connected as by an upper closure portion 31 to a means for securing the cylinder 30 to the cap member 26. Such means may take the form of a boss 32 which is pressed into a suitable aperture formed in the cap 26. The boss 32 may carry a threaded stud 33 to serve as one terminal of the device 18, and the other terminal thereof may be provided by a similar threaded stud 34 suitably secured to the closure portion 25 of the outer cylinder 24. As is represented in Fig. 3, the entire interior space defined by the outer cylinder 24 is filled with an electrolyte 35. The composition of the electrolyte and the material from which the cylinders 24 and 30 are made is considered in detail hereinafter.

The inner cylinder 30 is disposed concentrically within the outer cylinder 24, and is spaced from the inner surface of the outer cylinder so that the cylinders 24 and 30 constitute the two plates of a condenser, the capacitance of such condenser being dependent upon the plate areas, the spacing between the plates, and the dielectric constant of the electrolyte 35.

I have illustrated in Figs. 4 and 5 a modified form of the interference eliminating device 18. In the form of the apparatus shown in these figures, the metallic cylinders corresponding to the cylinders 24 and 30 of Fig. 3 take the form of extremely thin metallic layers shown at 24*a* and 30*a* deposited upon the inner and outer surfaces, respectively, of supporting cylinders 24*b* and 30*b* made of a low-loss insulating material, preferably glass. The layers 24*a* and 30*a* may be deposited on the cylinders by a spray process, by evaporation, or by a plating process, and this operation is preferably performed before the cylinders 24*b* and 30*b* are united. After the coatings 24*a* and 30*a* are applied, the cylinders 24*b* and 30*b* are placed in concentric relation as shown in Fig. 5 and the upper ends integrally joined to each other as by swaging or flaring the ends together and fusing them or welding them to each other in the manner represented at 36 in Fig. 5.

Suitable terminal members 37 and 38 are electrically connected as by soldering to the respective coatings 24*a* and 30*a* and extended beyond the limits of the annular space 39 defined between the concentrically disposed cylinders. This space is then substantially filled with the electrolyte and the lower ends of the cylinders are then swaged and flared and fused together and fused to the terminal conductors 37 and 38 to form a seal such as is represented at 40 to hermetically seal the electrolyte within the annular space 39.

As before stated, the tubes 24 and 30 and the coatings 24*a* and 30*a* are metallic and electrically conductive. The selection of material does not appear to be critical, although some materials give results which are superior to those achieved by others. For example, the metal parts may be made of copper and used in conjunction with a copper sulfate solution as an electrolyte. These particular materials have the disadvantage that the copper tends to oxidize, increasing the internal resistance of the cell somewhat more than the value of internal resistance giving the best results. On the other hand, the presence of the copper oxide layer appears to produce a partial rectification which, under certain circumstances, appears to give results superior to the results obtained with cells providing no such partial rectifying action.

Preferably, the metal parts of the device are made of a non-corrosive, non-oxidizing material. For example, excellent results have been obtained with copper or brass cylinders which have been silver plated, and similar results may be obtained with solid silver members. Ordinary stainless steel has been found to work well, and ordinary iron or mild steel members protected by a layer of nickel plating will also produce the desired results. The electrolyte to be used with any of these last-mentioned materials preferably comprises an aqueous solution of silver nitrate, although aqueous solutions of other soluble salts of silver may also be used. Similarly, aqueous solutions of the salts of other metals will operate satisfactorily, provided those solutions do not attack the metal parts of the device and provided the solutions used have high conductivity so as to provide a low internal resistance from plate to plate.

I have found that aqueous solutions of either silver nitrate or copper sulfate in a concentration of from five to ten per cent perform admirably. If silver nitrate is used, a small amount of nitric acid should be added to prevent the formation of silver oxide.

All of the solutions are preferably buffered by the addition of about one one-hundredth per cent pure gelatin, the gelatin being dissolved in hot water prior to the making up of the solution, for the reason that the pure gelatin dissolves with difficulty in a cold solution.

My experience has shown that an interference eliminator constructed and used as described herein materially improves the quality and clarity of the reproduction afforded by the receiving apparatus. This is particularly noticeable in the case of television receivers. The observable effect of the practice of this invention is the elimination of distortion, improvement in the fidelity with which the detail of the picture is rendered, an apparent improvement in the sharpness of the focus and the clarity with which the individual picture elements are delineated, and the elimination of extraneous manifestations such as the often-observed "snow" caused, it is said, by an unfavorable signal-to-noise ratio at the input to the receiver.

The manner in which the apparatus herein described operates to secure the advantageous results detailed in the preceding paragraph is not clearly understood. However, it will be realized that the device 18 constitutes a condenser having a relatively high capacitance, such relatively high capacitance resulting from the relatively large plate areas employed and the high dielectric constant of the solution which fills the space between the spaced plates of the condenser. At the same time, the dielectric, being a low resistance material and extending directly from plate to plate, provides a shunting resistance of low ohmic value so that the condenser structure as a whole may be said to differ radically from ordinary condenser structures in having an extremely low value of "Q."

When the device is used in the antenna or signal input circuit to the receiver, it is thought that this combination of high capacitance and low resistance provides a low impedance input path for both the alternating current and direct current components of the complex received signal. At the same time, the high capacitance in combination with the distributed inductance of the wires and the receiver input circuits serves as a trap to eliminate spurious signals such as static which are characterized by extremely sharp and steep wave fronts and their non-uniformity of occurrence in the form of short intense bursts of radio frequency energy. Also, it is thought that the electrical properties of the device are brought into cooperation with the circuit elements of the receiver proper to assist in minimizing cross modulation and undesired resonance effects.

It is also thought that the character of current flow from one plate to the other in the device has a bearing upon the results obtained, it being realized that the current actually passing through the device is carried by an ionic migration as distinguished from the electronic energy transfer characterizing the current flow in ordinary conductors. This theory is supported in part by the observed fact that the substitution of a metallic resistance for the electrolyte renders the device inoperable to secure the results which are secured when the electrolyte is used.

The units that are used in the power supply cricuit for the communications receiver appear to operate in a somewhat analogous manner in trapping out static and other types of noise which would otherwise be carried into the receiver over the conductors 21 and 22. Also, the relatively slow migration of the ions in the electrolyte appears to have a smoothing effect tending to eliminate cross-talk and cross-modulation which might otherwise result from the intercoupling effected through the ordinary power supply systems. Here again also, any adverse resonance effects that may be encountered appear to be substantially eliminated.

The devices 18 which are intended for use in the power supply circuit to the receiver should be of a sufficient size to provide such a low value of internal resistance as to reduce the voltage drop through the devices to the order of magnitude of one volt or less. With the interference eliminators constructed as described herein, it appears that plate areas such as are provided by an outer tube one and one-quarter inches in diameter and four inches long spaced one-eighth of an inch from the inner tube provide eminently satisfactory results. The plate area is not critical, as I have found, for example, that the length of a one and one-quarter inch tube may be varied as much as an inch and one-half either way from the four-inch length just mentioned. The device intended for use in the signal input circuit to the receiver may be substantially one-half the size of that intended for use in the power circuit. These dimensions are given herein not by way of limitation, but by way of illustration and example of a practical form of the device which by experience has been found to be effective in producing the results hereinbefore set forth.

While preferred embodiments of my invention have been illustrated and described herein, the invention is not to be limited to such details, except as defined in the appended claims.

I claim:

1. An interference eliminator for connection in an input circuit to a communication receiver comprising a pair of concentrically disposed silver cylinders spaced from each other to define an annular space therebetween, said annular space being filled with an electrolyte comprising an aqueous solution containing from five per cent to ten per cent silver nitrate.

2. An interference eliminator for connection in an input circuit to a communication receiver comprising a pair of concentrically disposed copper cylinders spaced from each other to define an annular space therebetween, said annular space being filled with an electrolyte comprising an aqueous solution containing from five per cent to ten per cent copper sulfate.

References Cited in the file of this patent

UNITED STATES PATENTS

| | | |
|---|---|---|
| 1,625,445 | Astrom et al. | Apr. 19, 1927 |
| 1,686,998 | Woodruff | Oct. 9, 1928 |
| 1,845,067 | Weaver | Feb. 18, 1932 |
| 1,914,114 | Estes | June 13, 1933 |
| 1,972,322 | Schmeuszer | Sept. 4, 1934 |
| 2,010,758 | Grimditch | Aug. 6, 1935 |
| 2,011,710 | Davis | Aug. 20, 1935 |
| 2,119,380 | Carter | May 31, 1938 |
| 2,130,073 | De Lange | Sept. 13, 1938 |
| 2,267,717 | Brennan | Dec. 30, 1941 |

FOREIGN PATENTS

| | | |
|---|---|---|
| 385,923 | Germany | Nov. 30, 1923 |